United States Patent [19]

Takata et al.

[11] Patent Number: 4,667,476
[45] Date of Patent: May 26, 1987

[54] BOOSTER

[75] Inventors: Koji Takata; Yukinori Nishiyama; Takashi Shinomiya, all of Itami, Japan

[73] Assignee: Sumitomo Electric Industries, Ltd., Osaka, Japan

[21] Appl. No.: 815,573

[22] Filed: Jan. 2, 1986.

[30] Foreign Application Priority Data

Jan. 14, 1985 [JP] Japan .................. 60-6063

[51] Int. Cl.[4] .............................. F15B 7/00
[52] U.S. Cl. ...................... 60/545; 60/550; 60/552; 91/369 B; 91/363 A
[58] Field of Search .......... 60/545, 551, 550, 582, 60/552; 91/369 R, 369 B, 363

[56] References Cited

U.S. PATENT DOCUMENTS

| 3,946,564 | 3/1976 | Nakagawa | 60/582 |
| 4,087,972 | 5/1978 | Scheffel | 60/550 |
| 4,206,605 | 6/1980 | Mehren | 60/545 |
| 4,224,832 | 9/1980 | Prohaska | 60/545 |
| 4,398,389 | 8/1983 | Horvath | 60/545 |
| 4,489,555 | 12/1984 | Leiber | 60/551 |
| 4,534,171 | 8/1985 | Leiber | 60/551 |

FOREIGN PATENT DOCUMENTS 2702820  7/1978  Fed. Rep. of Germany ........ 60/551

Primary Examiner—Abraham Hershkovitz
Attorney, Agent, or Firm—Ernest A. Beutler

[57] ABSTRACT

An improved booster for use with a master cylinder in a brake system is proposed which includes a spring for keeping the input shaft away from the booster piston. The spring has one end abutting on a piston acted by the auxiliary pressure from the auxiliary power source and the other end abutting on the brake pedal to bear the pedal stepping force. The input shaft will not engage the booster piston except in case of the failure of the auxiliary power source, ect.

3 Claims, 2 Drawing Figures

BOOSTER

The present invention relates to a booster used with a master cylinder in a brake system for vehicles.

In brake systems adopting an electronic data processor such as a microprocessor, manual control input such as the stepping force applied to the brake pedal is electrically detected, and a target deceleration is computed from the detected manual control input by the data processor, which controls the control fluid pressure applied to the booster through a control valve so that the actual deceleration will follow the target deceleration. Such brake systems are disclosed in e.g. U.S. Pat. No. 4,512,615.

With a conventional booster in such brake systems, the input shaft actuated by the brake pedal has its tip directly engaging the booster piston to apply a manual control force such as the pedal stepping force to the booster piston as well as the abovesaid control fluid pressure. This arrangement is adopted to obtain a required braking force only by human control force upon the failure of the auxiliary power source for supplying the control fluid pressure, computer or wiring. In the present application, the pedal stepping force is taken as an example of human control input.

With a conventional booster of such a construction, when the brake pedal is stepped, the control fluid pressure controlled by an electronic data processor acts on the booster piston, pushing it toward the master cylinder. This causes a temporary decrease in the reaction force acting on the tip of the input shaft. Accordingly, the value detected by the stepping force sensor decreases, so that the data processor will send to the control valve a command to decrease the control fluid pressure supplied to the booster. As a result, the input shaft sways to and fro and the brake pedal does not work smoothly but feels shaky or pulsating. This problem results from the fact that in the adopted construction the tip of the input shaft is in direct engagement with the booster piston, in order to provide for the failure of the auxiliary power source, and so on. The adoption of such a construction causes the formation of an electromechanical closed loop (the stepping force sensor→computer→control valve→booster piston→input shaft→stepping force sensor), so that a high frequency variation in the control pressure induced by the stiffness (or insufficient damping capability) of the fluid circuit in the control chamber will be fed back to the stepping force sensor and amplified.

An object of the present invention is to provide a booster which obviates the abovementioned problem, while providing for the failure of the auxiliary power source and so on.

In accordance with the present invention, the input shaft is adapted to be normally kept away from the booster piston and, in case of failure of the auxiliary power source, engage therewith. An auxiliary pressure-receiving chamber communicating to the auxiliary power source for the control fluid pressure is provided inside or outside of the booster. A spring has one end abutting on a piston slidably mounted in the auxiliary pressure-receiving chamber and the other end abutting on the brake pedal or a part integral with it.

In the arrangement according to the present invention, when the auxiliary power source is working normally, the pedal stepping force is borne by the spring and a control fluid pressure depending on the stepping force is applied to the booster piston through the control valve. If the force of the spring is so preset that some gap will be always kept between the booster piston and the input shaft, the input shaft will never engage the booster piston in the normal working condition because the force applied to the input shaft is fully borne by the spring. Therefore, the high frequency variation in the control pressure will never be fed back and amplified.

In case of failure of the auxiliary power source and so on, the piston in the auxiliary pressure-receiving chamber will retract, so that the spring will not work. As a result, the input shaft will butt directly on the booster piston, so that the pedal stepping force will be fully transmitted to the booster piston.

Other objects and features of the present invention will become apparent from the following description taken with reference to the accompanying drawings, in which.

Figure 1:
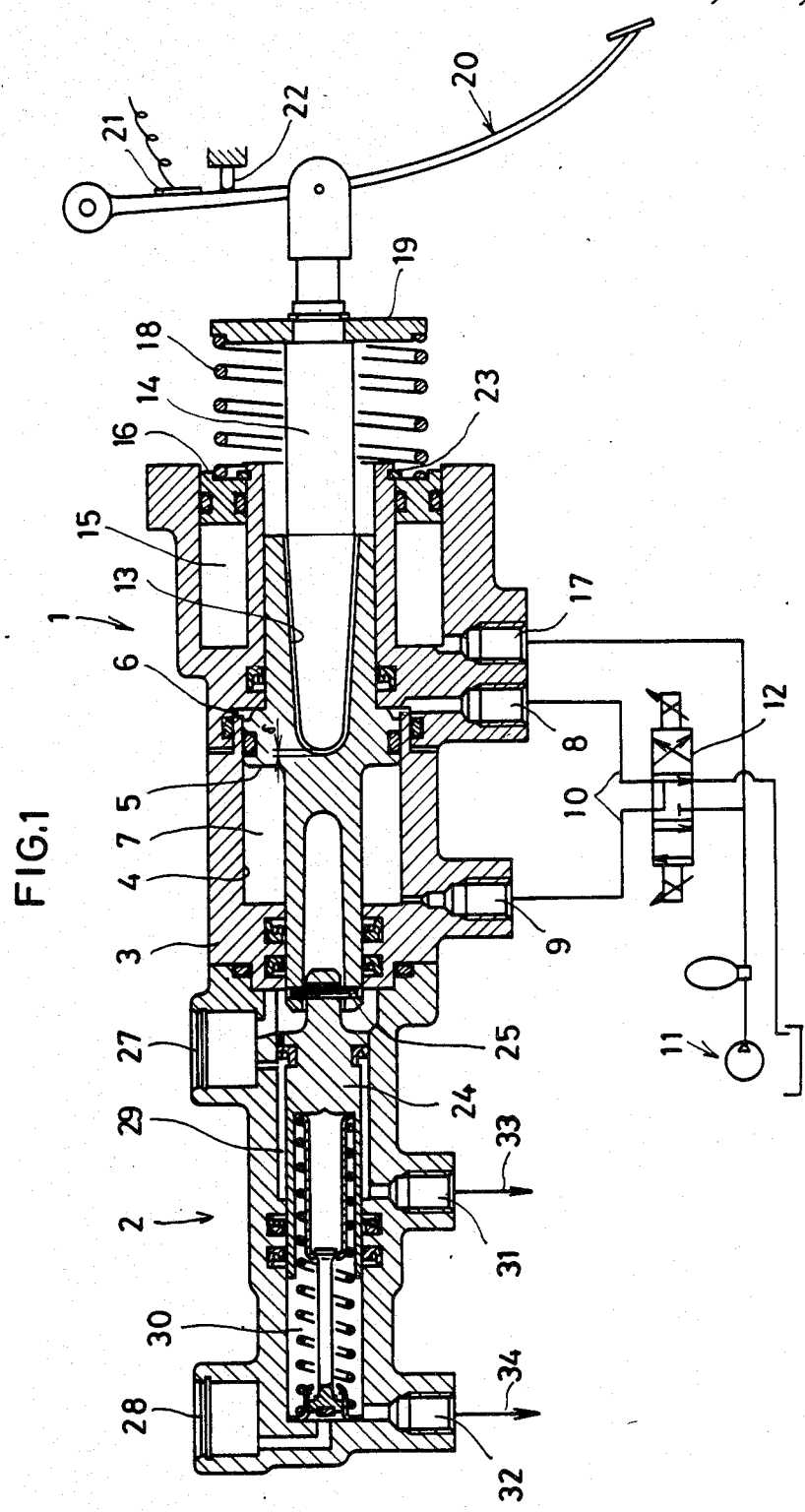
FIG. 1 is a vertical sectional view of the first embodiment.

The embodiment shown in FIG. 1 is an integral assembly of a booster 1 and a master cylinder 2 which are incorporated coaxially in a common body 3.

The booster 1 has a cylinder 4 partitioned by a booster piston 5 into two pressure-receiving chambers 6, 7. Ports 8 and 9 communicating with the chambers 6 and 7, respectively, are connected to power lines 10. Fluid pressure from an auxiliary power source 11 is regulated by a control valve 12 to a required pressure, which acts on pressure-receiving surfaces at both sides of the booster piston 5 through the power lines 10.

The booster piston 5 is formed with a deep recess 13 in its end surface at the input side to receive an input shaft 14. A predetermined amount of initial gap δ is kept between the bottom of the recess 13 and the tip of the input shaft 14.

The body 3 is formed with an annular auxiliary pressure-receiving chamber 15 at the input side. An annular piston 16 is inserted into the chamber 15, which is connected through a port 17 to the auxiliary power source 11. A spring 18 is mounted on the input shaft 14 with its one end abutting on the annular piston 16 and its other end abutting on a flange member 19 fixedly mounted on the input shaft 14. This arrangement serves to maintain the abovementioned gap δ.

A brake pedal 20 is pivotally mounted on the rear end of the input shaft 14 and a stepping force sensor 21 is mounted on the brake pedal 20. Numeral 22 designates a stopper for the brake pedal, and 23 designates a retaining ring for the piston 16.

A piston 24 of the master cylinder 2 is mounted coaxially with the booster piston 5 and coupled therewith by a pin 25. The master cylinder 2 has two pressure-receiving chambers 29, 30 which communicate through ports 27, 28, respectively, to a reservoir tank. These chambers 29, 30 are also connected through ports 31, 32 to different brake pressure lines 33, 34, respectively.

The operation will be described below.

If the auxiliary power source 11 is working normally, when a stepping force is applied to the brake pedal 20, the stepping force sensor 21 will detect the magnitude of the stepping force, which is given to a computer (not shown). The computer will determine a target deceleration from the detected magnitude of the stepping force and control through the control valve 12 the fluid pressures applied to the booster 1 to cause the actual deceleration to follow the target deceleration, so that required brake fluid pressures will be produced in the chambers 29, 30 of the master cylinder 2.

On the other hand, since the pressure in the auxiliary pressure-receiving chamber 15 is kept constant by means of the auxiliary power source 11, the stepping force acting on the input shaft 14 is borne by the force of the spring 18, which serves to give a reaction force to the driver. When the brake pedal is stepped, the input shaft 14 advances while compressing the spring 18. However, the booster piston 5 is adapted to always precede the input shaft 14 to keep some amount of gap between them. In order to assure this, the force of the spring 18 should be preset so that the stroke of the input shaft 14 for a given stepping force will be slightly shorter in comparison with the case in which the input shaft 14 and the booster piston 5 are coupled together.

If the auxiliary power source 11 fails, so that the pressure in the auxiliary pressure-receiving chamber 15 becomes zero, the piston 16 will retract when a stepping force acts on the spring 18. Thus, the force of the spring will not work to keep the input shaft 14 away from the booster piston 5. As a result, the booster piston 5 will be directly pushed by the input shaft 14, so that braking force will be produced in the master cylinder 2.

Figure 2:
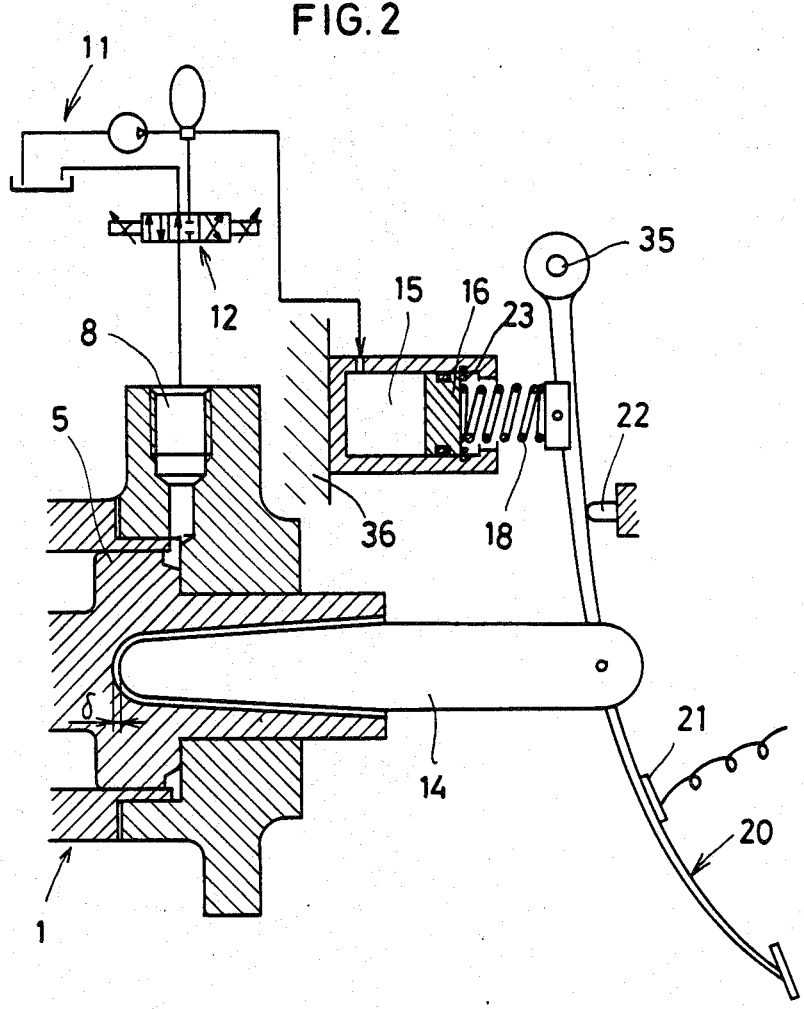
FIG. 2 is a vertical sectional view of a portion of the second embodiment.

In the second embodiment shown in FIG. 2, the auxiliary pressure-receiving chamber 15 is provided outside the body 3 at a stationary portion 36 near a shaft 35 around which the brake pedal 20 pivots. A spring 18 is arranged between the brake pedal 20 and the piston 16 mounted in the chamber 15. The operation of the second embodiment is the same as in the first embodiment.

No limitation is intended as to the construction of the master cylinder 2 and of the control valve 12. For example, since in a normal state the pedal stepping force correctly corresponds to the stroke of the pedal by the action of the spring 18, the stepping force sensor may be replaced with a stroke sensor.

As described above, since some gap is maintained between the input shaft and the booster piston, the above-mentioned electromechanical closed loop is not formed, and the high frequency variation in the control pressure is not fed back to the stepping force sensor. This makes smoother the operation of the brake pedal.

In accordance with the present invention, the reaction force against the stepping force is normally given by means of a spring, one end of which is borne by the fluid pressure from the auxiliary power source. Upon the failure of the auxiliary power source, the spring will retract, so that the input shaft directly engages the booster piston. Thus, in the case of failure of auxiliary power source which would require a very large stepping force, the stepping force to the input shaft is applied effectively to the booster piston without any loss due to the spring. An additional stroke which becomes necessary in the case of the failure of auxiliary power source is only the stroke required to compensate for the slight initial gap between the input shaft and the booster piston. The effect is extremely large in comparison with e.g. the arrangement in which a spring is merely placed between the pedal and the booster piston.

What we claim:

1. In a booster for a master cylinder comprising a body, a booster piston slidably mounted in said body for operating the master cylinder, a manual control input, an input shaft juxtaposed to said booster piston and actuated by said manual control input, a sensor for detecting the amount of said manual control input, a control valve, an auxiliary power source for supplying a control fluid pressure to said booster piston through said control valve, and a data processing means for controlling said control valve to control the amount of said control fluid pressure applied to said booster piston according to the value detected by said sensor, the improvement further comprising an auxiliary pressure-receiving chamber continuously pressurized from said auxiliary power source, a piston slidably mounted in said auxiliary pressure-receiving chamber and subjected to the pressure therein, and a spring between said piston and said manual control input for normally maintaining a fixed spacing between said input shaft and said booster piston for providing a reactive force against manual control input to actuate said sensor and for yielding to effect manual actuation of said master cylinder upon failure of said auxiliary power source.

2. A booster as claimed in claim 1, wherein said auxiliary pressure-receiving chamber is formed in said body.

3. A booster as claimed in claim 1, wherein said auxiliary pressure-receiving chamber is formed outside of said body.

* * * * *